(12) United States Patent
Carrillo (10) Patent No.: US 11,967,846 B2
(45) Date of Patent: Apr. 23, 2024

(54) MODULAR CHARGER FOR A GAME CONTROLLER

(71) Applicant: Gabriel Carrillo, Phoenix, AZ (US)

(72) Inventor: Gabriel Carrillo, Phoenix, AZ (US)

( * ) Notice: Subject to any disclaimer, the term of this patent is extended or adjusted under 35 U.S.C. 154(b) by 305 days.

(21) Appl. No.: 17/448,118

(22) Filed: Sep. 20, 2021

(65) Prior Publication Data

US 2023/0091876 A1    Mar. 23, 2023

(51) Int. Cl.
*H01M 10/46*  (2006.01)
*A63F 13/92*  (2014.01)
*H02J 7/00*  (2006.01)

(52) U.S. Cl.
CPC ............ *H02J 7/0044* (2013.01); *A63F 13/92* (2014.09)

(58) Field of Classification Search
CPC ......... H02J 7/0044; A63F 13/92; A63F 13/98; A63F 13/235
USPC .......................................... 320/107, 114, 115
See application file for complete search history.

(56) References Cited

U.S. PATENT DOCUMENTS

| | | | |
|---|---|---|---|
| 10,574,072 B2 * | 2/2020 | Tagtow | H02J 7/342 |
| 11,303,144 B1 * | 4/2022 | Mejia | H02J 7/0042 |
| 2016/0134144 A1 * | 5/2016 | Miller | H02J 7/342 |
| | | | 320/107 |
| 2016/0226274 A1 * | 8/2016 | Navid | A63F 13/90 |
| 2017/0093190 A1 * | 3/2017 | Miller | F21L 4/085 |

FOREIGN PATENT DOCUMENTS

WO    WO-2018035442 A1 *   2/2018

* cited by examiner

*Primary Examiner* — Edward Tso
(74) *Attorney, Agent, or Firm* — Cynthia S. Lamon; Lamon Patent Services (57) ABSTRACT

A mobile charger for a game controller includes a printed circuit board supporting a universal serial bus plug at one end of the board and a charging plug at the opposing end, the board further supporting a rechargeable battery, a housing body including a base form having an internal volume and a top plate, the housing body including opposing openings for the USB plug and the charging plug, the top plate including a mounting location for mounting the PCB, the top plate aligned over and mountable to the base form. The USB male plug may be inserted into a female USP port to receive a and whereby the male charging plug may be plugged into a female charge port on the wireless game controller to offload the charge in the rechargeable battery to the wireless game controller rechargeable battery while the controller is use during game play.

18 Claims, 9 Drawing Sheets

MODULAR CHARGER FOR A GAME CONTROLLER

BACKGROUND OF THE INVENTION

1. Field of the Invention

The present invention is in the field of computer-aided gaming and pertains particularly to methods and apparatus for charging a game controller while in use by a player.

2. Discussion of the State of the Art

In the art of gaming, participants use game controller devices that may be wirelessly connected to a game console to control avatars and other aspects of the gaming program running on the console. Wireless game controllers allow a player free mobility while playing a specific game, as some games require very specific movement and detection, such as golf, dancing, etc. Game controllers may be battery powered devices that may be charged by connecting a micro universal serial bus (USB) cable plugged into a power source and connected to the controller using an output micro-USB that fits into a micro-USB port on the controller. There are also charging bays available that a game controller may be docked to be charged while they are not being used, typically the game console, itself. A fully charged game controller or a controller using fresh alkaline (no rechargeable) batteries may last up to 30 hours of playtime.

A challenge to gaming is that often players desire to play a game but one or more game controllers require charging. A controller may be used while a charge cable is connected to it, however depending on the movements of the player using the controller, the tether or cable may hang up on furniture and become dislodged from the controller interrupting the game sometimes at critical moments in the game. Additionally, using a controller while a charging cable is attached limits distance one can be from a charging computerized device, such as a gaming console. A player may not be able to play from a comfortable position on a couch. In the absence of a cable, the controller that is low on charge may be required to sit in a charging bay and cannot be used while docked. Therefore, what is clearly needed is a modular, portable charger for a game controller that can be plugged into the micro-USB port of the controller while it is in use.

BRIEF SUMMARY OF THE INVENTION

According to an embodiment of the present invention, modular mobile charging apparatus for a wireless game controller comprising a printed circuit board (PCB) supporting an input universal serial bus (USB) male plug disposed at one end of the board and an output charging male plug disposed at the opposing end of the board, the board having access to a rechargeable battery, a housing body including a base form having an internal volume and a top plate, the housing body including opposing openings for the USB plug and the charging plug, the top plate including a mounting location for mounting the PCB, the top plate aligned over and mountable to the base form, characterized in that the input USB male plug may be inserted into a female USP port on a power source to receive a charge to the rechargeable battery, and whereby the male charging plug may be plugged into a female charge port on the wireless game controller to offload the charge in the rechargeable battery to the wireless game controller rechargeable battery while the controller is in a state of use during game play.

In one embodiment, the input USB male plug is an A-type standard plug and the male charging plug is a micro USB type A charging plug. In one embodiment, the charging plug is a USB-C discharge port. In one embodiment, the rechargeable battery is mounted to the PCB. In one embodiment, the USB plug may receive charge from a computing device, a gaming console, a vehicle battery-to-USB adaptor, and an alternating current (AC)-to-USB adaptor. In one embodiment, the battery has a capacity of equal to or greater than 3.7 volts. In one embodiment, the battery resides within the internal volume of the base form and is connected to the PCB by wire.

In another embodiment of the present invention, the charging apparatus further includes a retainer clip accessory operated as a separate part installed to the game controller for clipping to the housing body when the micro-USB plug is plugged into the micro-USB charge port on the game controller retaining the charging apparatus in inserted position in the port. In this embodiment, the retainer clip includes to clip arms spaced apart on a base strip, the base strip including a central opening for providing access to the micro-USB charge port on the game controller, the clip arms including hooked ends that seat in depressions provided for the purpose on the housing body. In a variation of this embodiment, the housing body includes slots in place of depressions.

In another variation of this embodiment, the retainer clip is glued onto the game controller via a glue strip provided on the back side of the base strip. In a further variation of the embodiment, the retainer clip is installed onto the game controller using screw hardware. In one aspect of this embodiment, the angle of extension of the clip arms from the base strip is predesigned according to a known contour of the game controller surface at the micro-USB charge port. In a preferred variation of the embodiment, the rounded front of the housing body functions to spread the clip arms of the retainer clip apart before they snap back into their seats during the act of plugging in the micro-USB plug into the micro-USB charge port on the game controller.

According to another embodiment of the present invention, a modular mobile charging apparatus for a wireless game controller comprising a printed circuit board (PCB) supporting a universal serial bus (USB) male plug disposed at one end of the board and a charging male plug disposed at an opposing end of the board, the board further supporting a rechargeable battery, a carriage platform to which the PCB is mounted to, the carriage platform including opposing slide buttons extending orthogonally from the edges of the carriage platform and a housing body including a base plate and top housing, the housing body including opposing openings for the input USB male plug and the charging male plug and opposing slots for supporting the carriage platform at stem portions of the slide buttons, the slide buttons accessible from outside the housing body.

The input USB male plug and the male charging plug may be alternatively retracted into and extended out from the housing body by sliding the carriage platform along the slots in the housing body, whereby the input USB male plug may be extended and plugged into a power source to receive a charge to the rechargeable battery and whereby the male charging plug may be extended and plugged into a mated charge port on the wireless game controller to offload charge to the wireless game controller battery while the controller is in a state of use during game play.

In this embodiment, the carriage platform is frictionally controlled relative to sliding the platform along the slots in the housing body. In a variation of this embodiment, the frictional control is provided through tight tolerancing of the stem portions of the slide buttons relative to the slot width in the housing body. In one aspect of this embodiment the base plate closes the housing body using standard screw hardware. In the first claimed embodiment lacking moving parts, the top plate closes the housing body using standard screw hardware. Also in the first claimed embodiment, the PCB is mounted to the top plate using standard screw hardware.

According to an embodiment of the present invention, a modular charging apparatus for a game controller is provided and includes a printed circuit board (PCB) supporting an input universal serial bus (USB) plug disposed at one end of the board and an output micro-USB charge plug disposed at an opposing end of the board, the board further supporting a rechargeable battery, a carriage platform to which the PCB is mounted to, the carriage platform including opposing slide buttons extending orthogonally from the edges of the carriage platform, and, a housing body including a base plate and top housing, the housing body including opposing openings for the USB plug and micro-USB plug and opposing slots for supporting the carriage platform at the stem portions of the slide buttons, the slide buttons accessible from outside the housing body. The input USB male plug and the output micro-USB charge plug may be alternatively retracted into and extended out from the housing body by sliding the carriage platform along the slots in the housing body, whereby the input USB male plug may be extended and plugged into a power source to receive a charge to the rechargeable battery and whereby the output micro-USB charge plug may be extended and plugged into a micro-USB charge port on a game controller to offload charge to the game controller battery while the controller is in a state of use.

In one embodiment, when one of the charge plugs is extended from the housing body, the other charge plug is retracted into the housing body. In one embodiment, the rechargeable battery is mounted to the PCB. In another embodiment, the rechargeable battery is contained in a compartment and is connected to the charge board by lead wires. In a preferred embodiment, the USB plug may receive charge from a computing device, a gaming console, a vehicle battery-to-USB adaptor, and an alternating current (AC)-to-USB adapter. In one embodiment, the battery has a capacity of 3.7 volts.

In one embodiment, the charging apparatus further includes a retainer clip accessory operated as a separate part installed to the game controller for clipping to the housing body when the micro-USB plug is plugged into the micro-USB charge port on the game controller retaining the charging apparatus in inserted position in the port. In this embodiment, the retainer clip includes to clip arms spaced apart on a base strip, the base strip including a central opening for providing access to the micro-USB charge port on the game controller, the clip arms including hooked ends that seat in depressions provided for the purpose on the housing body. In a variation of this embodiment, the housing body includes slots in place of depressions. In one variation of the embodiment the retainer clip is glued onto the game controller via a glue strip provided on the back side of the base strip. In another variation of this embodiment, the retainer clip is installed onto the game controller using screw hardware.

In a further variation of the clip embodiment, the angle of extension of the clip arms from the base strip is predesigned according to a known contour of the game controller surface at the micro-USB charge port. In one embodiment of the present invention, the carriage platform is frictionally controlled relative to sliding the platform along the slots in the housing body. In a variation of this embodiment, the frictional control is provided through tight tolerancing of the stem portions of the slide buttons relative to the slot width in the housing body. In one embodiment, the base plate closes the housing body using standard screw hardware. In one embodiment including the retainer clip, the rounded front of the housing body functions to spread the clip arms of the retainer clip apart before they snap back into their seats during the act of plugging in the micro-USB plug into the micro-USB charge port on the game controller.

DETAILED DESCRIPTION OF THE INVENTION

In various embodiments described in enabling detail herein, the inventor provides a unique charging device for a game controller that may be used to charge the controller while it is being used. The present invention is described using the following examples, which may describe more than one relevant embodiment falling within the scope of the invention. It is a goal of the present invention to provide charging capability to a game controller of a computer-aided game during use of the controller to play the game.

Figure 1A:
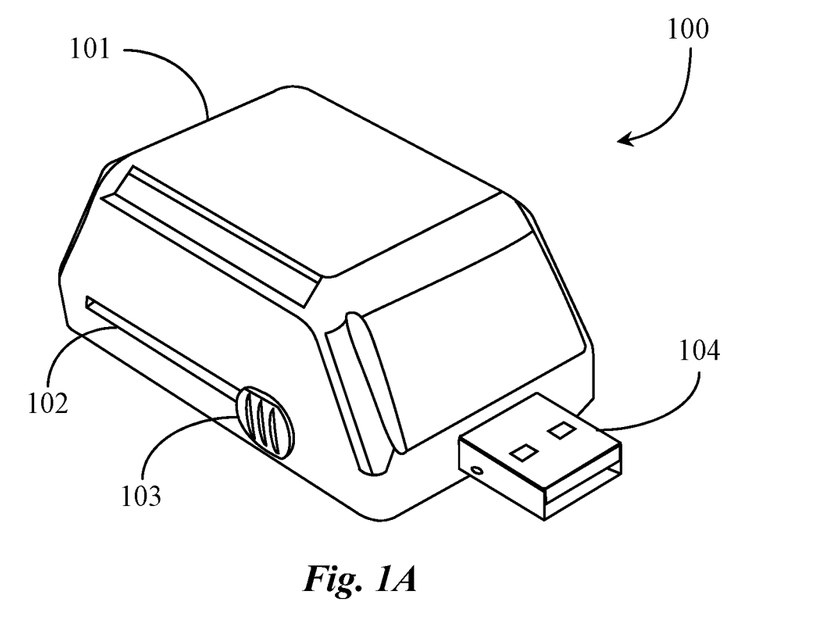
FIG. 1A is a perspective view of a modular game controller charging device depicting an end bearing an extended USB plug.

FIG. 1A is a perspective view of a modular game controller charging device 100 depicting an end bearing an extended USB plug. Controller charging device 100 is adapted to provide a charging capability to any game controller of a computer-aided gaming console or gaming box during play of the game without disrupting the game. Charging device 100 is an assembly of mechanical and electrical components and includes a device housing 101 that encloses the electrical and mechanical components. Housing 101 may be molded of a rigid, lightweight, plastic or polymer material. Housing 101 has a length, a width, and a depth that provides sufficient volume for housing the above-mentioned components.

Charging device 100 includes a printed circuit board (PCB) not visible in this view that supports a PCB rechargeable battery and two opposing charge plugs. In this view, an input universal serial bus (USB) male charge plug 104 is depicted in an extended position through a rectangular opening in housing 101 provided for the purpose. In one embodiment, input USB charge plug 104 is completely retractable into housing 101 with the aid of a carriage platform that slides longitudinally back and forth within the housing and can be manipulated by a slider mechanism 103 protruding through slots 102 provided on opposing sides of housing 101, although only one side is shown. Input USB male charge plug 104 is adapted to plug into a USB charge port on a laptop, a gaming console, or computer to receive power from the onboard power source to charge a battery enclosed within charging device 100. Input USB plug 104 may be plugged into an AC/USB wall adapter that is plugged into a power outlet or into a car jack/USB adapter.

Figure 1B:
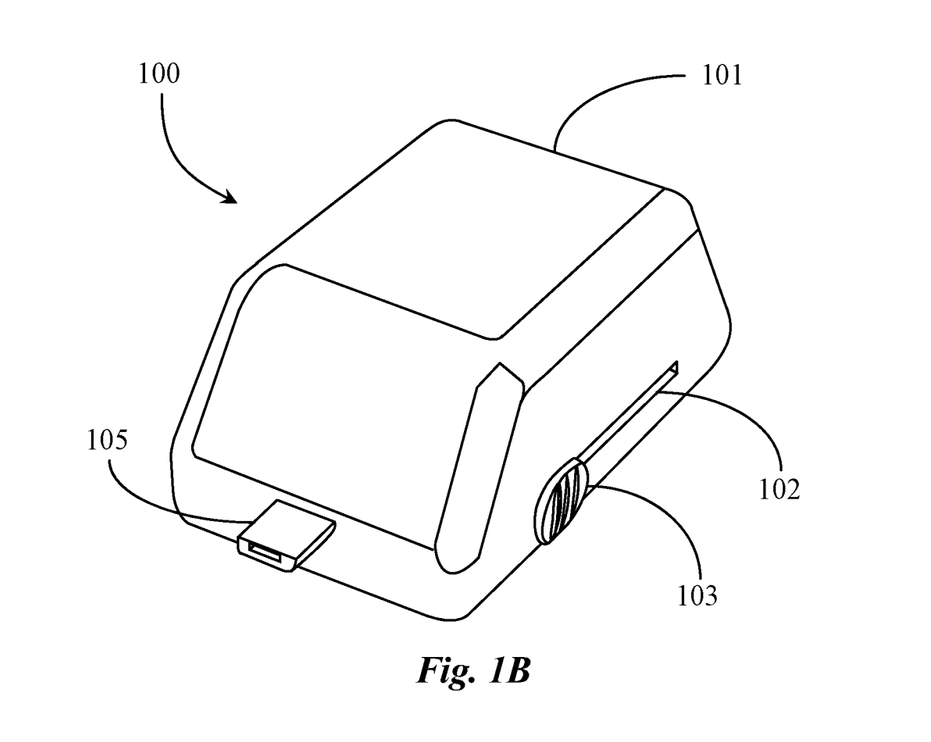
FIG. 1B is a perspective view of the modular game controller charging device of FIG. 1A depicting an opposing end bearing an extended micro-USB plug.

FIG. 1B is a perspective view of modular game controller charging device 100 of FIG. 1A depicting an opposing end bearing an extended output micro-USB male plug 105. In this perspective view, charging device is rotated 180 degrees to depict the output micro-USB charge plug 105 extended with the aid of the carriage device describe above. Output micro-USB male plug 105 adapted to fit into a micro-USB charging port on a game controller to transfer power from the onboard battery to the rechargeable battery in the game controller. The PCB board supporting the opposing USB plugs is shorter in length than hosing 101 allowing for one of the charge plugs 104 or 105 to be retracted into the housing while the other charge plug is extended for use. The carriage platform supports the PCB board and uses slots 102 as a track system. Slider buttons 103 are urged in one direction to extend one charge plug or the opposing charge plug for use. Plastic housing 101 may be radiused or rounded on all edges and corners to promote physical comfort for a user handling the device. Slider buttons 103 extend through slots 102 at opposing sides of housing 101 and may be knurled, slotted, or otherwise surfaced for grip ease afforded to the user operating the device.

Figure 2:
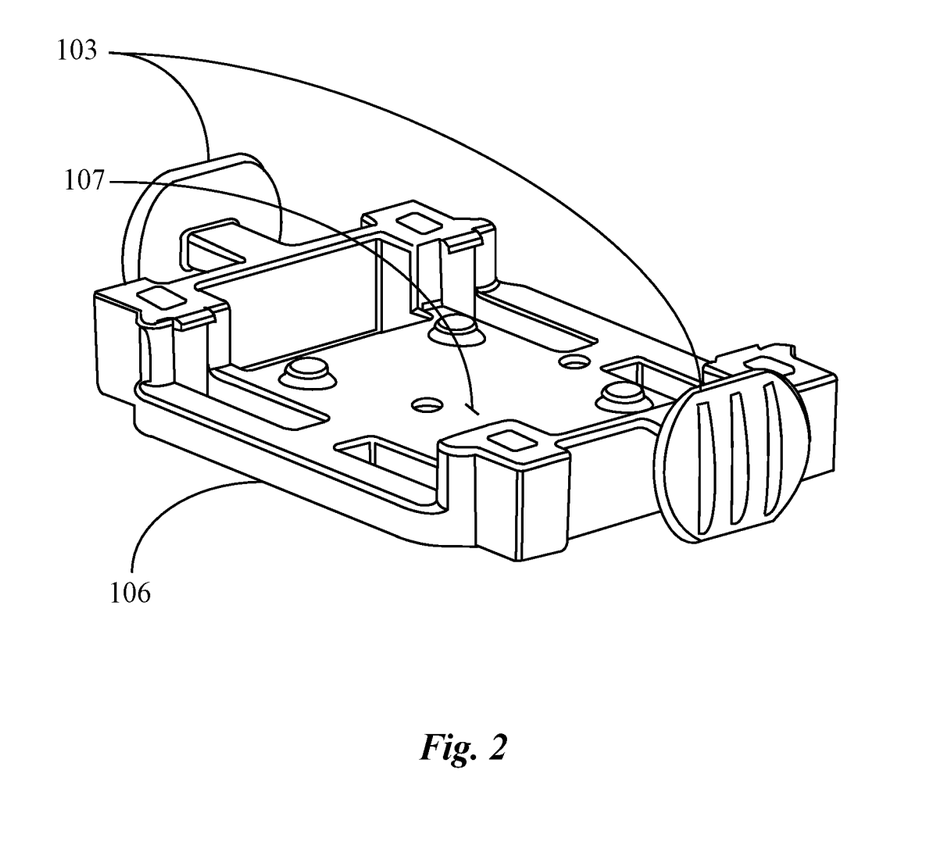
FIG. 2 is a perspective view of a sliding carriage apparatus of the modular game controller device of FIG. 1A and FIG. 1B.

FIG. 2 is a perspective view of a sliding carriage apparatus 106 of modular game controller device 100 of FIG. 1A and FIG. 1B. Carriage 106 may be fabricated from a lightweight plastic or polymer material. Carriage 106 is adapted to support a PCB mounted thereto that includes the opposing plugs 104 (input USB plug) and 105 (output micro-USB plug). Slider buttons 103 extend orthogonal from the longitudinal direction of slide path and are accessible outside of housing 101 described further above. Slots 102 support the stems connecting the slider buttons 103 to the carriage 106, such that the carriage is suspended within housing 101 and may be urged back and forth as required to extend and retract one charge plug or the other charge plug. It is duly noted that the standard size USB charge plug 104 (FIG. 1A) is adapted to receive power from a USB-enabled power source to charge a rechargeable PCB battery (not visible) connected to both opposing charge plugs on the PCB. Output micro-USB charge plug 105 (FIG. 1B) is adapted to charge a rechargeable game controller battery or set of batteries in the game controller through the standard micro-USB charge port on the controller. The charging plugs or ports are not limited to what is shown, but may also include Lightning and Samsung 30-pin. Additional types include USB A-C Type, micro USB A or B, USB mini-b (5 pin or 4 pin) USB 3.0 A or B-Type, USB 3.0 micro B, micro USB AB or USB Mini b (Fugi). The apparatus may be adapted to any plug types known in the art or that may be envisioned in the future.

Sliding carriage 106 may be fabricated of a lightweight polymer material that may include Delrin or similar dense polymatroids that are machinable and have a low friction coefficient. Carriage 106 has a machined interface topside 113 that may serve as a mounting interface for a PCB that includes the opposing USB charge plug components. Opposing slide buttons 103 extend through slots 102 (FIG. 1A,1B) providing a user interface for extending and retracting each USB charge plug through openings in housing 101 (FIG. 1A,B) provided therein for the purpose.

Figure 3:
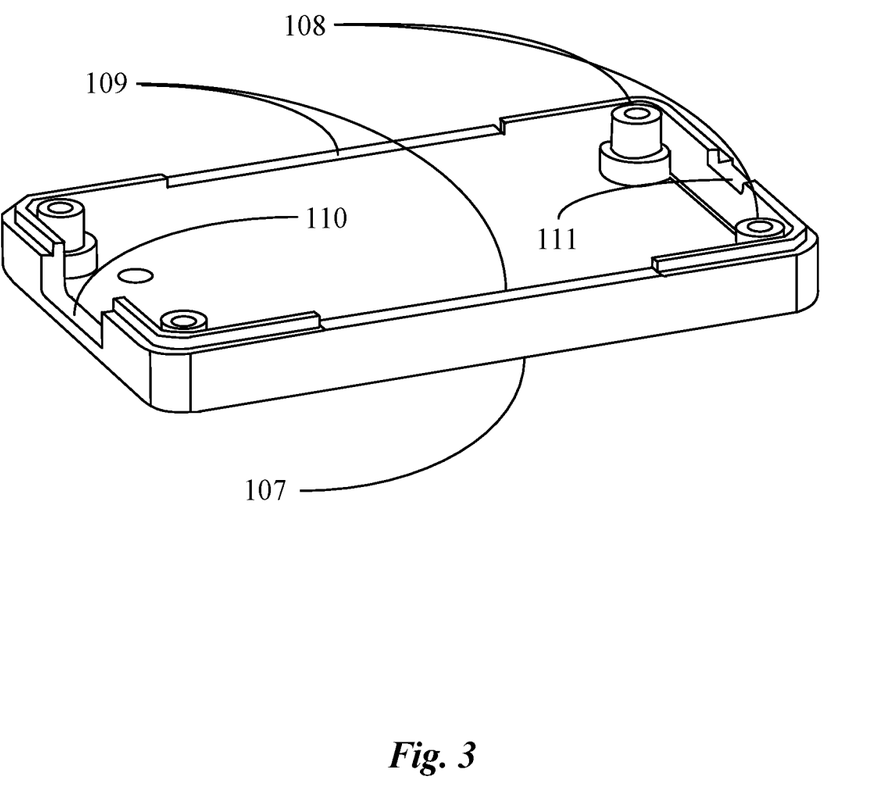
FIG. 3 is a perspective view of a housing base supporting the sliding carriage apparatus of FIG. 2.

FIG. 3 is a perspective view of a housing baseplate 107 completing housing 101 of FIGS. 1A and 1B. Base plate 107 may be fabricated of lightweight plastic or polymer material and closes the housing body of housing 101 to complete the assembly enclosing all of the mechanical and electric components. Mounting posts 108 are provided at four corners of the rectangular form for the purpose of accepting hardware for closing the modular charging assembly. Baseplate 107 includes the lower portions 109 of opposing slots 102 depicted in FIGS. 1A and 1B. As well, the openings for the opposing charge plugs are represented herein as lower portions of said openings 110 for the standard USB plug and 111 for the micro-USB plug. Modular charger 100 (FIG. 1) may be disassembled by removing baseplate 107 from the upper housing body. Screws may be used as fasteners to assemble charger 100.

Figure 4:
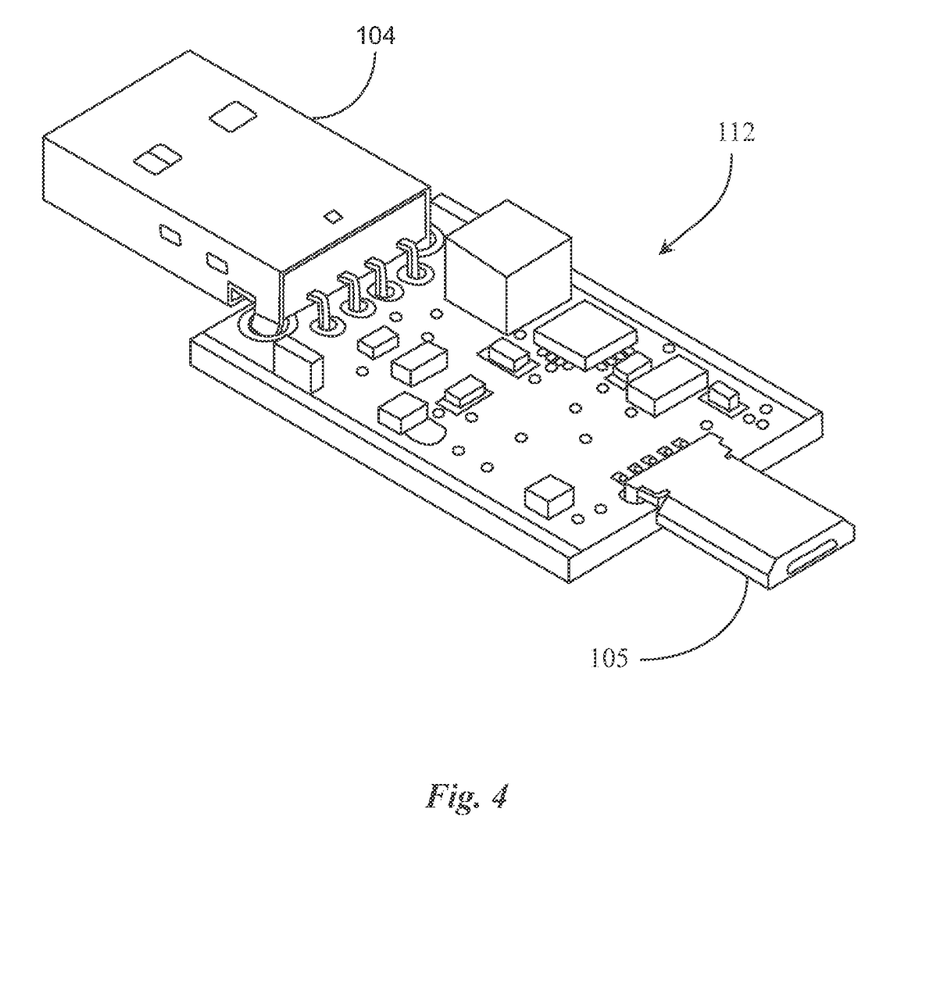
FIG. 4 is a perspective view of a printed circuit board supporting the opposing USB plugs and a rechargeable battery mounted on the sliding carriage apparatus of FIG. 2.

FIG. 4 is a perspective view of a printed circuit board 112 supporting the opposing USB plugs and a rechargeable battery mounted on the sliding carriage apparatus of FIG. 2. Printed circuit board (PCB) 112 is adapted to support a PCB rechargeable battery (not pictured here) that may be charged through input USB plug 104 introduced in FIG. 1A above and may transfer charge to another rechargeable device through output micro-USB plug 105 introduced in FIG. 1B above. PCB 112 includes all of the required circuitry, transistor, resistors, electrical traces, etc. to enable charging the PCB battery and then using the charged battery to power (charge) the battery or batteries of a game controller. PCB 112 is, in a preferred embodiment, mounted to sliding carriage 106 introduced in FIG. 2 above so that each plug might be retracted and extended from housing 101 introduced in FIGS. 1A and 1B. In one embodiment, the PCB battery is mounted or otherwise contained on PCB 112 and is wired to the appropriate leads on the board for charge and for discharge to a game controller. In a preferred embodiment, the PCB battery is a lightweight Li ion or similar rechargeable battery weighing approximately 2-3 grams having a rectangular form of about 0.5 to 1 inch in length, 0.5 inch in width, and a one-eight inch in thickness dimension. In some embodiments, the battery may be cylindrical with dimensions of 18 mm wide and 50 mm long.

Figure 5:
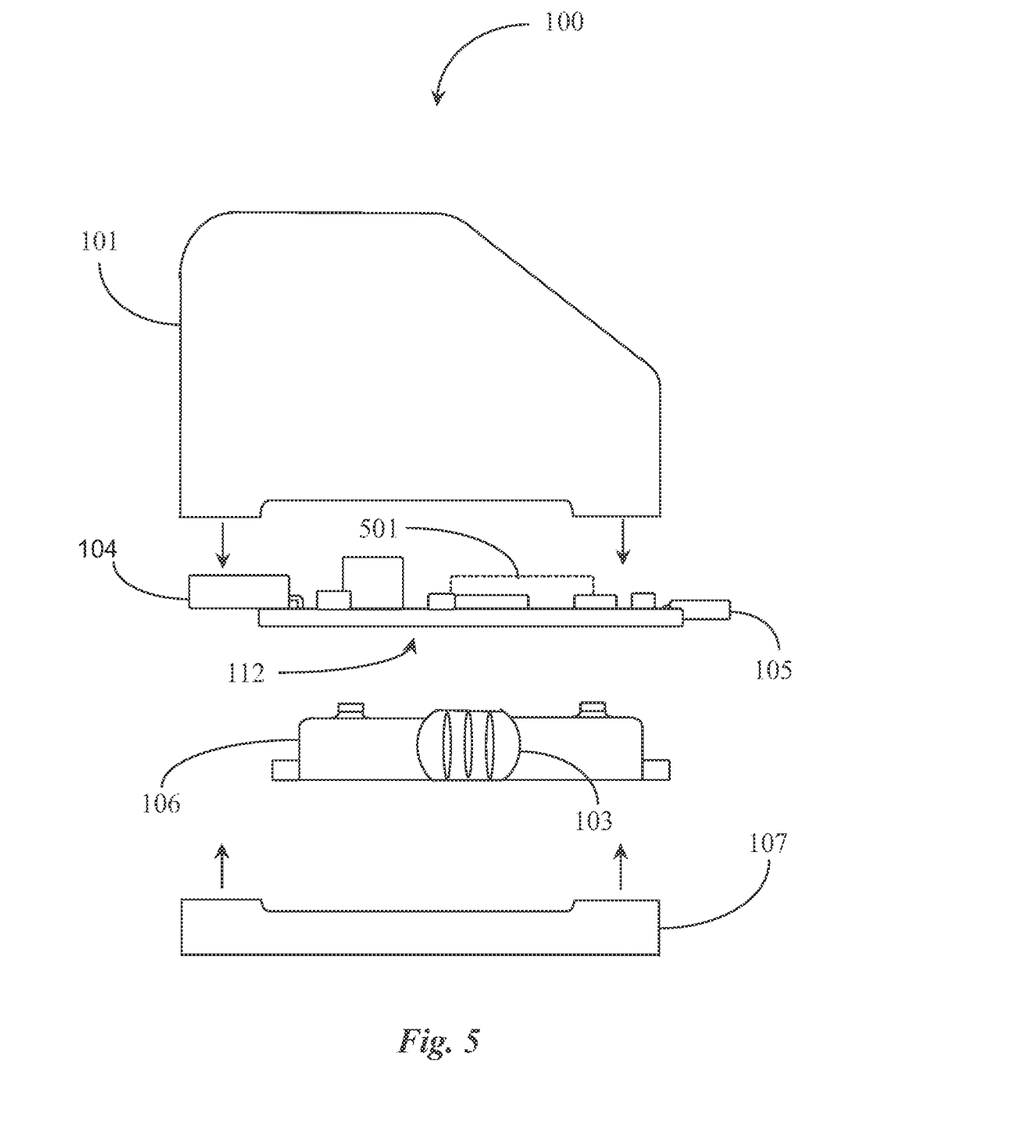
FIG. 5 is an exploded elevation view of the game controller charging device of FIG. 1 and FIG. 2 depicting order of assembly.

FIG. 5 is an exploded elevation view of game controller charging device 100 of FIG. 1A and FIG. 1B depicting order of assembly of parts. In this view, PCB 112 supporting opposing charge plugs input USB plug 104 and output micro-USB plug 105 is mounted to or otherwise affixed to sliding carriage 106. In this embodiment a rechargeable PCB battery 501 (broken boundary) is depicted on PCB 112 and may be retained thereon by hardware, pocket, or compartment to prevent it from sliding or becoming disconnected from the PCB. The battery 501 may be larger than shown, having more capacity, the only requirement is that it nests on the PCB and fits within the housing 101, not impeding the sliding ability of carriage 106. Housing body 101 fits over carriage 106 and PCB 112 and is closed in assembly by base plate 107 according to the direction of the arrows. A user manipulates carriage 106 by interaction with opposing slide buttons 103. In one embodiment, free movement of carriage 106 is slightly limited by friction tolerancing wherein the slots are held to a uniform with that is just larger that the width or diameter of the stem portions of slide buttons 103 allowing frictional contact.

In one embodiment, the carriage platform 106 is suspended with the housing 101 of charger device 100 wherein the bottom surface of the carriage suspends just above the floor of baseplate 107. In another embodiment, the friction tolerancing calls for the underside of the carriage to rub against the floor of the baseplate creating some friction so that the retracted and extended positions are maintained positionally without requiring repeated readjustments.

Figure 6:
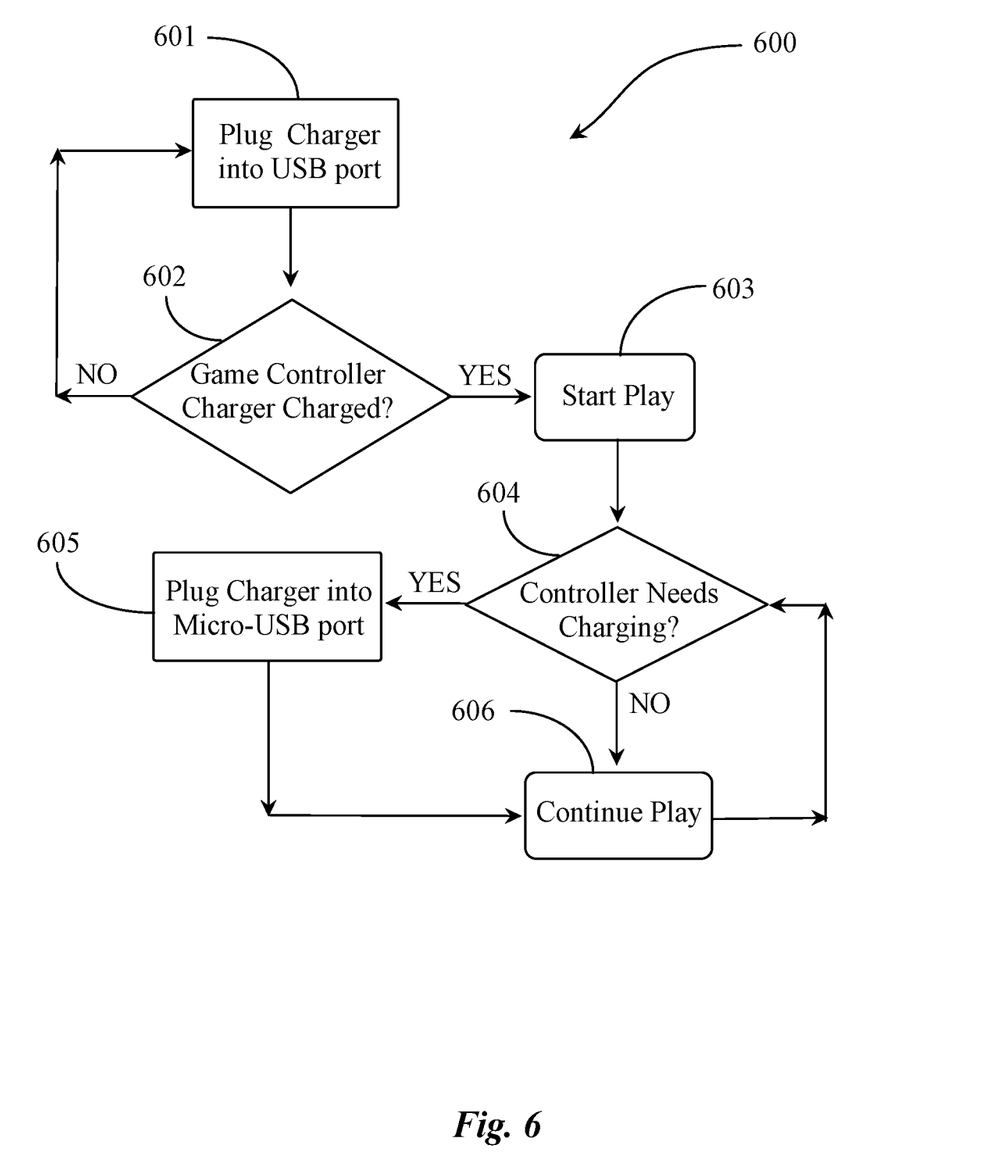
FIG. 6 is a process flow chart depicting steps for charging an active game controller while play continues.

FIG. 6 is a process flow chart 600 depicting steps for charging an active game controller while play continues. It is assumed in this process that charging device 100 is first charged at step 601 by plugging it into a USB port on a computing device, for example a gaming console, or into a USB port on an AC/USB adapter. At step 602, it may be determined by a user whether the game controller charger is fully charged. The modular game controller charger may include one or more light emitting diodes (LEDs) that are visible from outside of the housing for communicating the charge state of the device.

If at step 602, the user determines that the game controller charger is not fully charged, the process may loop back to step 601. If it is determined that the game controller charger is fully charged at step 602, the user and one or more gaming partners may start play at step 603. At step 604, a player may determine if a game controller requires charging during game play. If at step 604 it is determined that the game controller does not require charging, then play is continued at step 606. If at step 604 it is determined that a game controller requires charging, then the fully charged game controller charger may be plugged into the micro-USB charge port on the game controller while the game controller is in active use and the process proceeds to step 606 without interruption of the game in process. After step 606, the process loops back to decision step 604 as game play continues.

In one embodiment of the present invention, the game controller charger may include a retaining spreader clip that may be glued to or otherwise installed over the micro-USB port on the game controller wherein the clip wings may latch into grooves or indents provided on the outside of the housing of the device so that the charger may be retained in port with more structural integrity preventing inadvertent disconnection and mitigating any side-to-side forces against the charger device while it is plugged into the controller. Such an accessory device is not required to practice the present invention but may provide structural integrity to the interface and assurance that inadvertent disconnects do not occur during game play using the controller being charged. More detail about such an accessory clip is provided in the embodiment described below.

Figure 7:
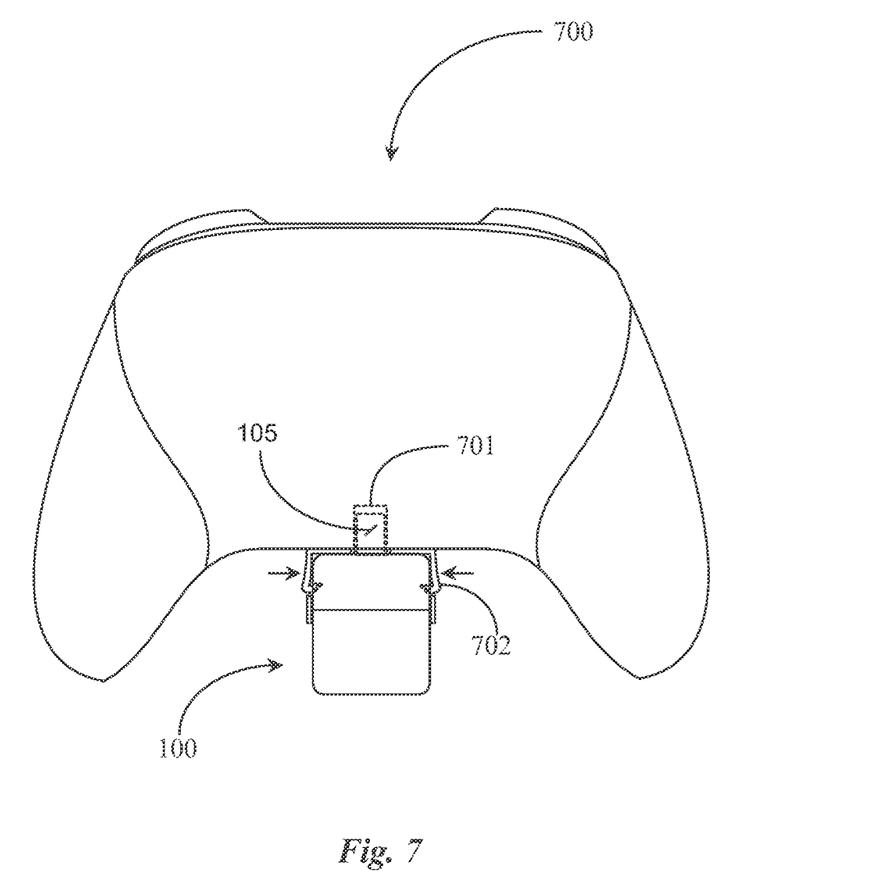
FIG. 7 is an overhead view of a computer-aided game controller with the modular charging device of FIGS. 1A and 1B retained in a ported position in the micro-USB charge port of the game controller.

FIG. 7 is an overhead view of a wireless game controller 700 with the modular charging device of FIGS. 1A and 1B retained in a ported position in the micro-USB charge port of the game controller. In this embodiment, a game controller 700 is depicted at least in outline. Gaming controls are not illustrated in this view but may be assumed present. Game controller 700 includes a micro-USB charge port 701 for accepting a charge plug. Charging device 100 is plugged into game controller 700 via micro-USB charge plug 105.

In this embodiment, an accessory retainer clip 702 may be provided with charging device 100 that may be glued on to or otherwise installed over micro-USB charge port 701. Retainer clip 702 is a spreader clip having two retainer arms with hook ends that may fit within slots or clip depressions placed on the outside opposing sides of game controller charging device 100. Retainer clip 702 may be fabricated of a resilient, somewhat flexible, metal, plastic or polymer composite material. Retainer clip 702 is adapted to be spread apart, creating tension, at the retainer arms when a user plugs charger device 100 into charge port 701 with micro-USB charge plug in extended position. The clip arms of retainer clip 702 are, in a preferred embodiment, flexed outward by the edge-rounded housing body of the charging device when the device is being plugged in and then snap back to position according to the direction of the arrows with the aid of strategically placed slots or depressions provided on the housing body. Such slots or depressions are adapted to accept the hooked ends of the parallel clip arms in order to secure charging device 100 into the charge position and provide protection against unintended removal of the charging device due to any forces that might affect the coupling during routine play using game controller 700. In a preferred embodiment, the clip arms are sufficiently flexible for enabling a user to remove charging device 100 from port 701 by urging one or both of the flexible clip arms back out of the slots or depressions manually, after which the charging device may be unplugged.

Figure 8A:
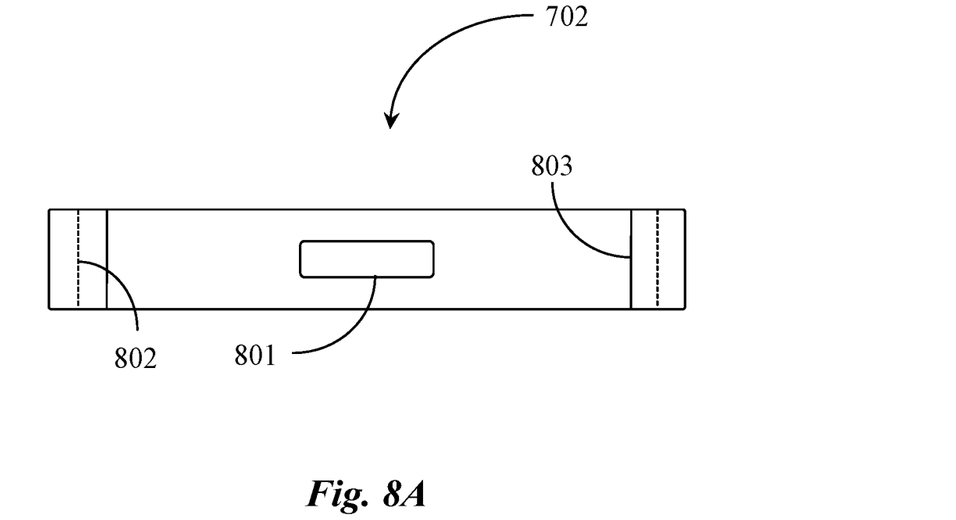
FIG. 8A is a front elevation view of the housing retainer clip of FIG. 7.

FIG. 8A is a front elevation view of the housing retainer clip 702 of FIG. 7. Retainer clip 702 has an oblong opening 801 placed at center of a base strip that may be aligned dimensionally over a micro-USB port like port 701 of FIG. 7 so access to the port is not obstructed. The base strip is flexible and light weight and may conform to a straight surface or to a slightly or moderately curved surface. In the case where a micro-USB port is located on a curved surface, the angle of the clip arms 802 relative to the base strip may be changed to offset the curvature enabling the same spread and snap in function afforded by the clip hooked ends 803. In one embodiment, more than one clip maybe provided with a modular game controller charger like charger 100 wherein clips are designed specifically for popular game controllers having known contours at the micro-USB charge port surfaces.

Figure 8B:
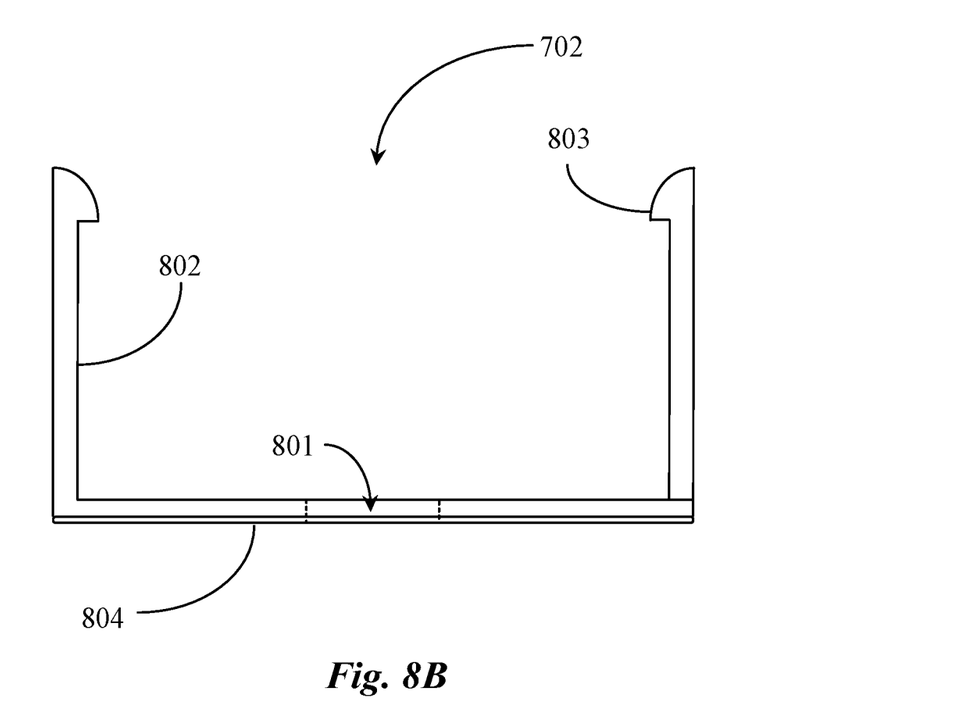
FIG. 8B is a side elevation view of the housing retainer clip of FIG. 8A.

FIG. 8B is a side elevation view of housing retainer clip 702 of FIG. 8A. Retainer clip 702 has two clip arms 802 supporting hooked ends 803 that are adapted to seat into slots or depressions 703 (FIG. 7) provided on the outside opposing surfaces of the game charging device. In one embodiment, small handle forms (not depicted) may be provided on the outside surfaces of the flexible clip arms 802 so that a user may finger grab them to pull hooked ends 803 out from the slots or depressions in the housing body of the game charger when decoupling the charge plug from the charge port on the game controller.

In one embodiment, the base strip including around the micro-USB port relief opening may include a glue strip backing 804 with a peel off cover enabling a user to orient the clip and glue it onto the game controller surface via the backing. In another embodiment, a retainer clip may come with a small diameter drill bit and two small self-tapping screws enabling a user to install the clip and remove the clip if required. Clip 702 is not specifically required in order to practice the present invention. It may be provided as an accessory to improve the structural integrity of the micro-USB coupling between the charging device of the invention and a game controller when the controller is being charged while in use. In one embodiment, a game controller charging device may be provided as a fixed element with no moving parts such as a slider platform to support PCB 112.

Figure 9:
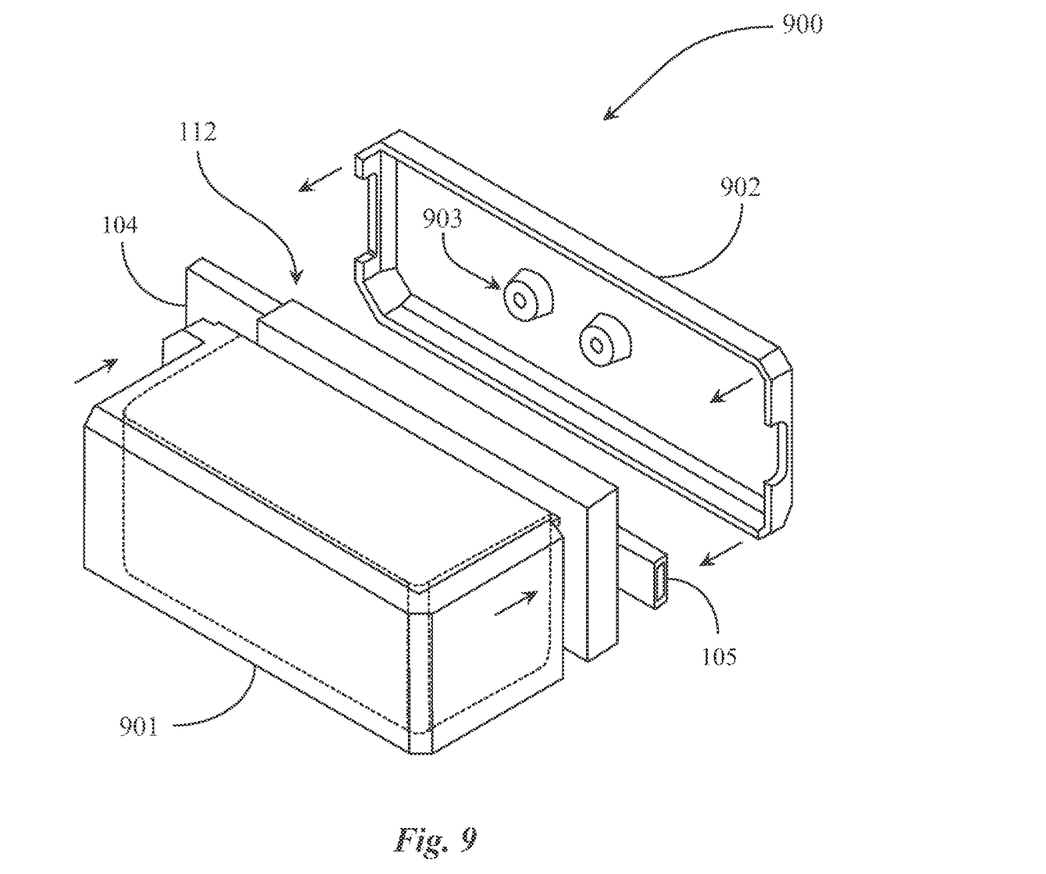
FIG. 9 is a perspective view of a modular game controller charging device according to another embodiment of the present invention.

FIG. 9 is a perspective view of a modular game controller charging device 900 according to another embodiment of the present invention. In this embodiment, charging device 900 is shown disassembled and having a hollow base form 901 and a top plate 902 adapted to be mountable to PCB 112 and base form 901 to fix PCB 112 in position with input USB plug 104 and output micro-USB plug 105 extending through appropriately dimensioned material relief openings placed in the end walls of top plate 902 with material relief extending to the base form 901 on the side of input USB plug 104. Top plate 902 includes a pair of linearly arranged conical mounting forms 903 providing screw mounting capability to mount PCB 112 to top plate 902.

Top plate 902 may be aligned to and installed to base form 901 using screw hardware, snap hardware, or latch hardware fitted thereto according to the directional arrows. Top plate 902 has a depth that is sufficient to cover the thickness dimension of PCB 112. Base form 901 is largely hollow having an internal volume (broken boundary) that may be accessed by removing the base form from the top plate and PCB 112. Internal volume inside base form 901 may be used to store a battery connected to PBB 112, and perhaps an extra battery. In this embodiment, charging device 900 has no moving parts like the slider platform introduced in FIG. 5 as carriage 106. Therefore, USB components are not retractable into the charging device housing. In one embodiment, separate end caps made of plastic or rubber may be provided to protect the USB components when charging device 900 is not in use.

It will be apparent with skill in the art that the modular game controller charging device of the present invention may be provided using some or all the elements described herein without departing from the spirit and scope of the invention. The arrangement of elements and functionality thereof relative to the charging device of the invention is described in different embodiments each of which is an implementation of the present invention. While the uses and methods are described in enabling detail herein, it is to be noted that many alterations could be made in the details of the construction and the arrangement of the elements without departing from the spirit and scope of this invention. The present invention is limited only by the breadth of the claims below.

The invention claimed is:

1. A modular mobile charging apparatus for a wireless game controller comprising:
   a printed circuit board (PCB) supporting an input universal serial bus (USB) male plug disposed at one end of the board and an output male charging plug disposed at the opposing end of the board, the board having access to a rechargeable battery;
   a housing body including a base form having an internal volume and a top plate, the housing body including opposing openings for the input USB male plug and the output male charging plug, the top plate including a mounting location for mounting the PCB, the top plate aligned over and mountable to the base form;
   characterized in that the output male charging plug may be plugged into a female charge port on the wireless game controller to offload the charge in the rechargeable battery to the wireless game controller rechargeable battery while the wireless controller is hand-held, mobile and in a state of use during game play.

2. The charging apparatus of claim 1, wherein the input USB male plug is an A-type standard plug and the output male charging plug is a micro USB type A charging plug.

3. The charging apparatus of claim 2, wherein the output male charging plug is a USB-C discharge port.

4. The charging apparatus of claim 1, wherein the rechargeable battery is mounted to the PCB.

5. The charging apparatus of claim 1, wherein the input USB male plug may receive charge from a computing device, a gaming console, a vehicle battery-to-USB adaptor, and an alternating current (AC)-to-USB adaptor.

6. The charging apparatus of claim 1, wherein the rechargeable battery has a capacity of equal to or greater than 3.7 volts.

7. The charging apparatus of claim 1, wherein the rechargeable battery resides within the internal volume of the base form and is connected to the PCB by wire.

8. The charging apparatus of claim 1, further including a retainer clip accessory operated as a separate part installed to the game controller for clipping to the housing body when the output male charging plug is plugged into a micro-USB charge port on the game controller retaining the charging apparatus in inserted position in the port.

9. The charging apparatus of claim 8, wherein the retainer clip includes to clip arms spaced apart on a base strip, the base strip including a central opening for providing access to the output micro-USB charge port on the game controller, the clip arms including hooked ends that seat in depressions provided for the purpose on the housing body.

10. The charging apparatus of claim 9, wherein the housing body includes slots in place of depressions.

11. The charging apparatus of claim 9, wherein the retainer clip is glued onto the game controller via a glue strip provided on the back side of the base strip.

12. The charging apparatus of claim 8, wherein the retainer clip is installed onto the game controller using screw hardware.

13. The charging apparatus of claim 2, wherein an angle of extension of the clip arms from the base strip is predesigned according to a contour of the game controller surface at the micro-USB charge port.

14. The charging apparatus of claim 9, wherein a rounded front of the housing body functions to spread the clip arms of the retainer clip apart before they snap back into their seats during the act of plugging in the output male charging plug into the micro-USB charge port on the game controller.

15. A modular mobile charging apparatus for a wireless game controller comprising:
   a printed circuit board (PCB) supporting an input universal serial bus (USB) male plug disposed at one end of the board and an output charging male plug disposed at an opposing end of the board, the board further supporting a rechargeable battery;
   a carriage platform to which the PCB is mounted to, the carriage platform including opposing slide buttons extending orthogonally from edges of the carriage platform; and
   a housing body including a base plate and top housing, the housing body including opposing openings for the input USB male plug and the output charging male plug and opposing slots for supporting the carriage platform at stem portions of the slide buttons, the slide buttons accessible from outside the housing body;

characterized in that the input USB male plug and the output male charging plug may be alternatively retracted into and extended out from the housing body by sliding the carriage platform along the slots in the housing body, whereby the input USB male plug may be extended and plugged into a power source to receive a charge to the rechargeable battery and whereby the output male charging plug may be extended and plugged into a mated charge port on the wireless game controller to offload charge to the wireless game controller battery while the controller is in a mobile, hand-held state of use during game play.

16. The charging apparatus of claim 15, wherein the carriage platform is frictionally controlled relative to sliding the platform along the slots in the housing body.

17. The charging apparatus of claim 1, wherein the frictional control is provided through tight tolerancing of the stem port ins of the slide buttons relative to a slot width in the housing body.

18. The charging apparatus of claim 15, wherein the base plate closes the housing body using standard screw hardware.

\* \* \* \* \*